7837X
No Printed Specification Available
J. Shaw,
Straw Cutter.
Patented Nov. 19. 1833.
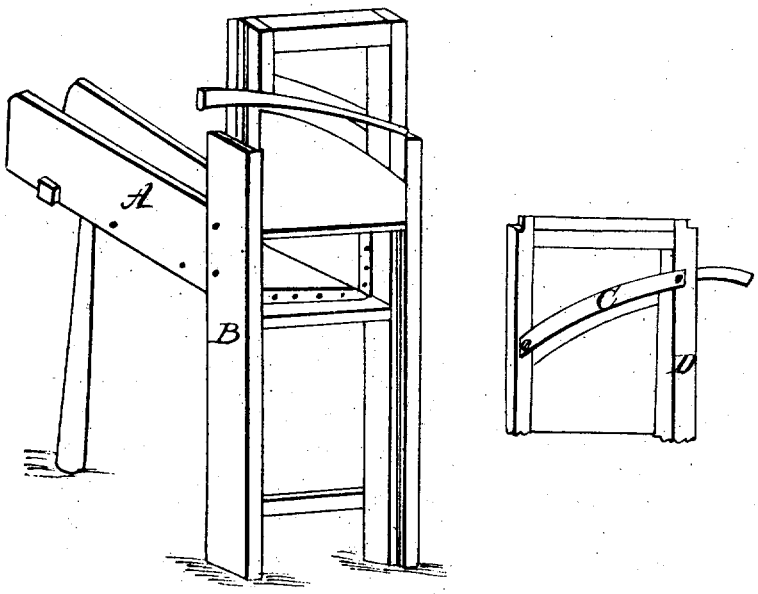

11/19/1833 7837X

Nov. 19. 1833 [illegible]

John Shaw's Straw Cutter
Letters Patent

The Schedule referred to in these Letters Patent and making part of
the same containing a description in the words of the said John Shaw
himself of his improvement in the Straw Cutter.

To all to whom these Presents shall come
Be it known that I John Shaw of the City & County of Philadelphia &
State of Pennsylvania have invented a new and useful improvement in the
Straw Cutter & that the following is a full & exact description of the construc
tion and operation of the said Machine as invented or improved by me, viz.
A. The box, this made in the usual form, the hind end being under & stand
ing higher than the front one being supported by posts & a girt, having a piece
of board fastened on the top of said box, near the front end, also a strip
of steel screwed on the inside of said box near the front end for the knife
to pass close to it. B. The posts these framed together with girts, one near
the lower ends & one near the middle, for the front of said box to rest on being
screwed one on each side of said box & projecting out beyond said end, hav
ing each grooves for the tongues in the gate to fit in. C. The knife, this
is made of steel being curved on the edge & sharp on the concave edge, hav
ing holes near each end to screw it on across the back side of the gate at an
angle of about forty degrees, & so placed that when the gate works up & down,
the said sharp edge will pass close by the edge of said steel. D. The gate,
this is an oblong frame having on the outside of each longest part a tongue
to fit in the groove in said posts & a handle screwed in the front side across
said gate to work it up & down. Also said gate has a board [illegible] in
& screwed on the outside on the lower part of said gate that can be mov
ed in & out to gauge the length of the straw to be cut, not coming quite
up to the said knife. Also the [illegible] lower end of said posts
to be [illegible] off on the back side. The advantages of this improvement are
the [illegible] of the Machine, the ease, [illegible] [illegible] that the work [illegible]
[illegible] John Shaw [illegible]
[illegible]